Sept. 8, 1970 R. E. ALLEN 3,527,370
LOADING ATTACHMENT FOR TRUCKS
Filed Dec. 4, 1968 5 Sheets-Sheet 1

Inventor:
Ralph E. Allen,
by [signature]
Attorney

Sept. 8, 1970  R. E. ALLEN  3,527,370
LOADING ATTACHMENT FOR TRUCKS

Filed Dec. 4, 1968  5 Sheets-Sheet 3

Inventor:
Ralph E. Allen,
by Abbott Spear
Attorney

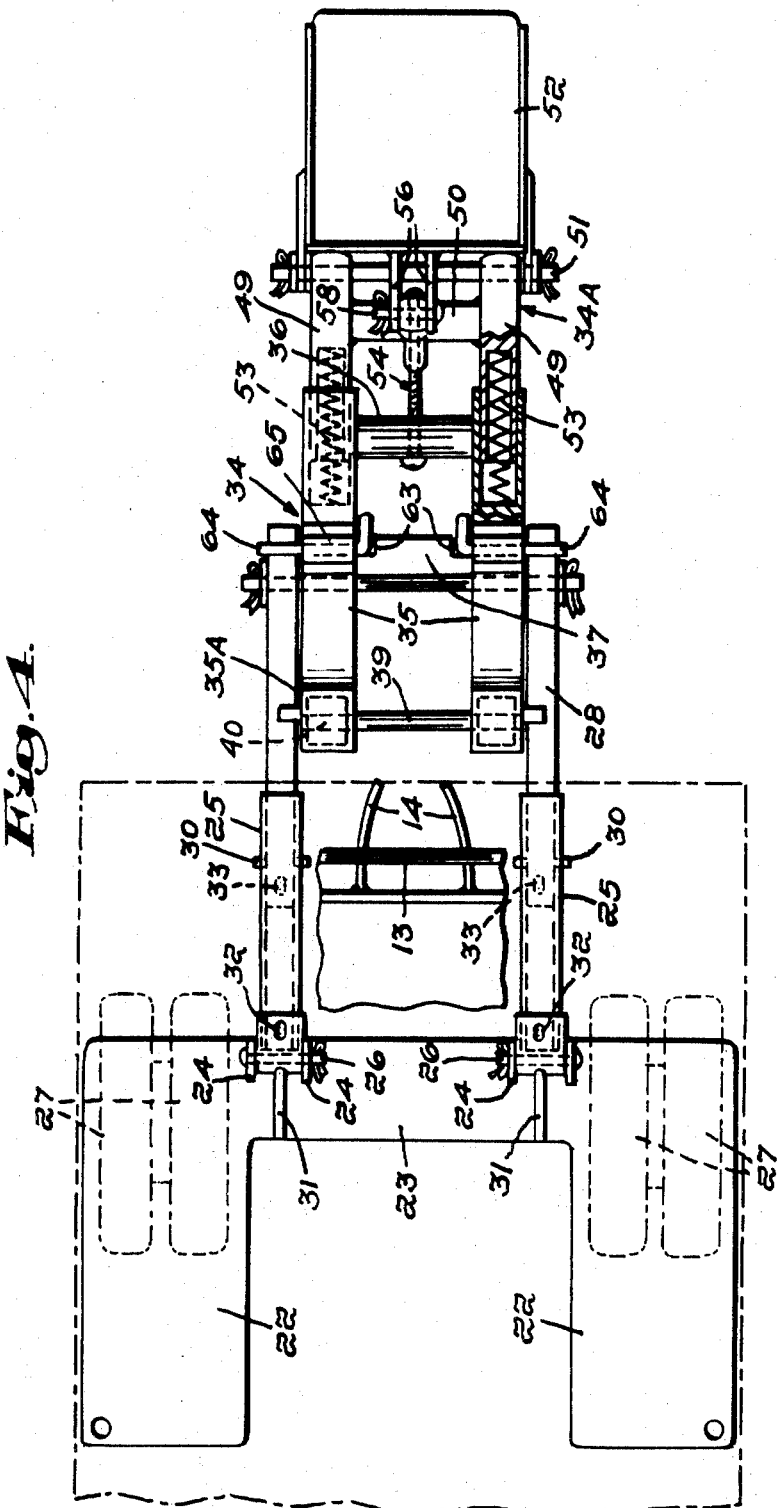

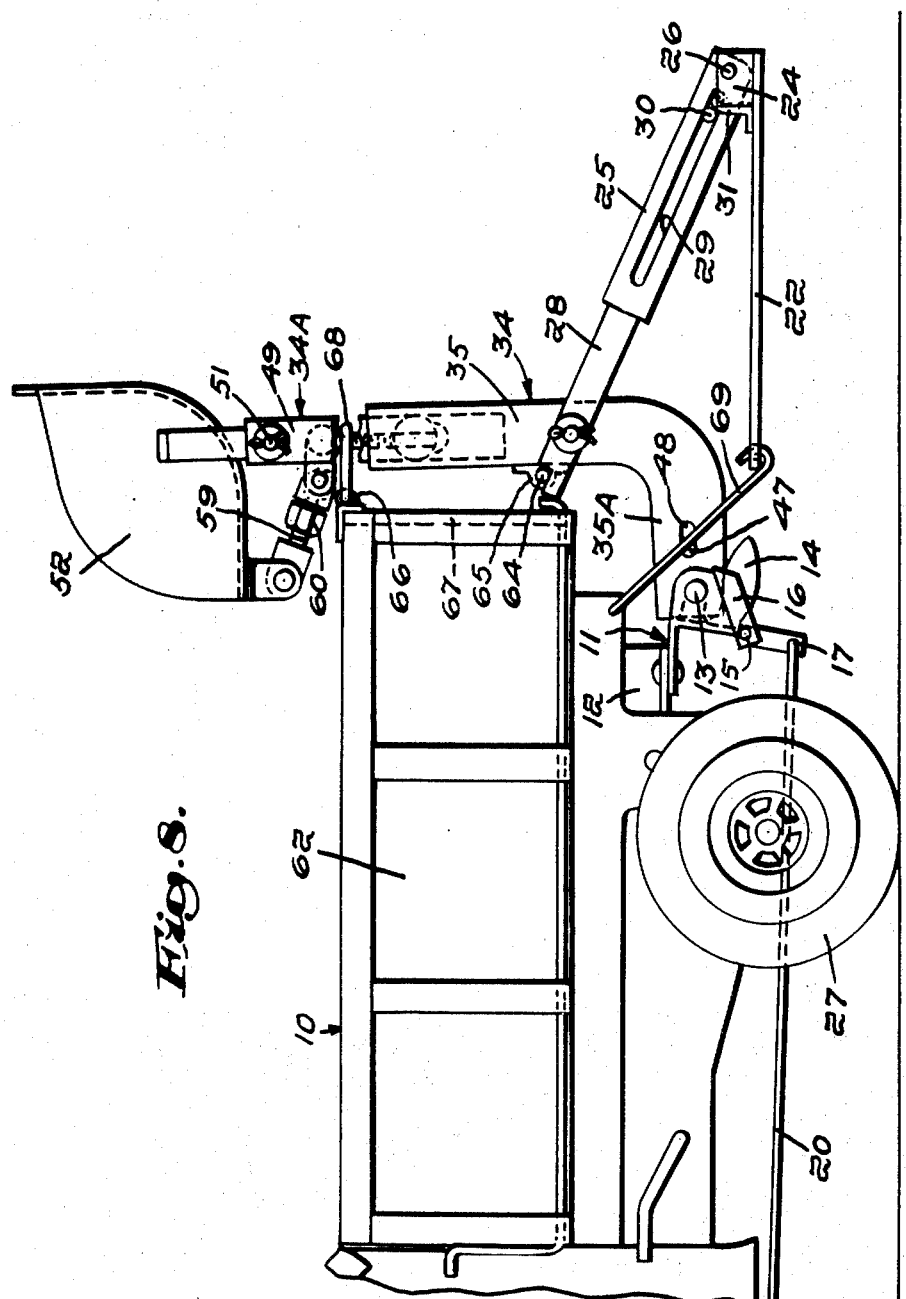

United States Patent Office 3,527,370
Patented Sept. 8, 1970

3,527,370
LOADING ATTACHMENT FOR TRUCKS
Ralph E. Allen, 56 Elmwood Ave.,
South Portland, Maine 04106
Filed Dec. 4, 1968, Ser. No. 781,039
Int. Cl. B60p 1/48
U.S. Cl. 214—354                         16 Claims

ABSTRACT OF THE DISCLOSURE

An attachment for trucks is disclosed that consists of a base to which telescoping members are pivotally connected. A frame having a bucket at its rear end is transversely pivoted to the free ends of the telescoping members. In use, the truck is backed over the base and coupled to the frame. After the truck is backed into the material to be loaded, it is driven forwardly and as its rear wheels pass over the base, the frame is swung upwardly to bring the bucket into a dumping position over the truck body. Means are provided to prevent pivoting of the frame, rearwardly when the bucket is in a dumping position and forwardly when the attachment is to be moved over the highway.

---

Figure 1:
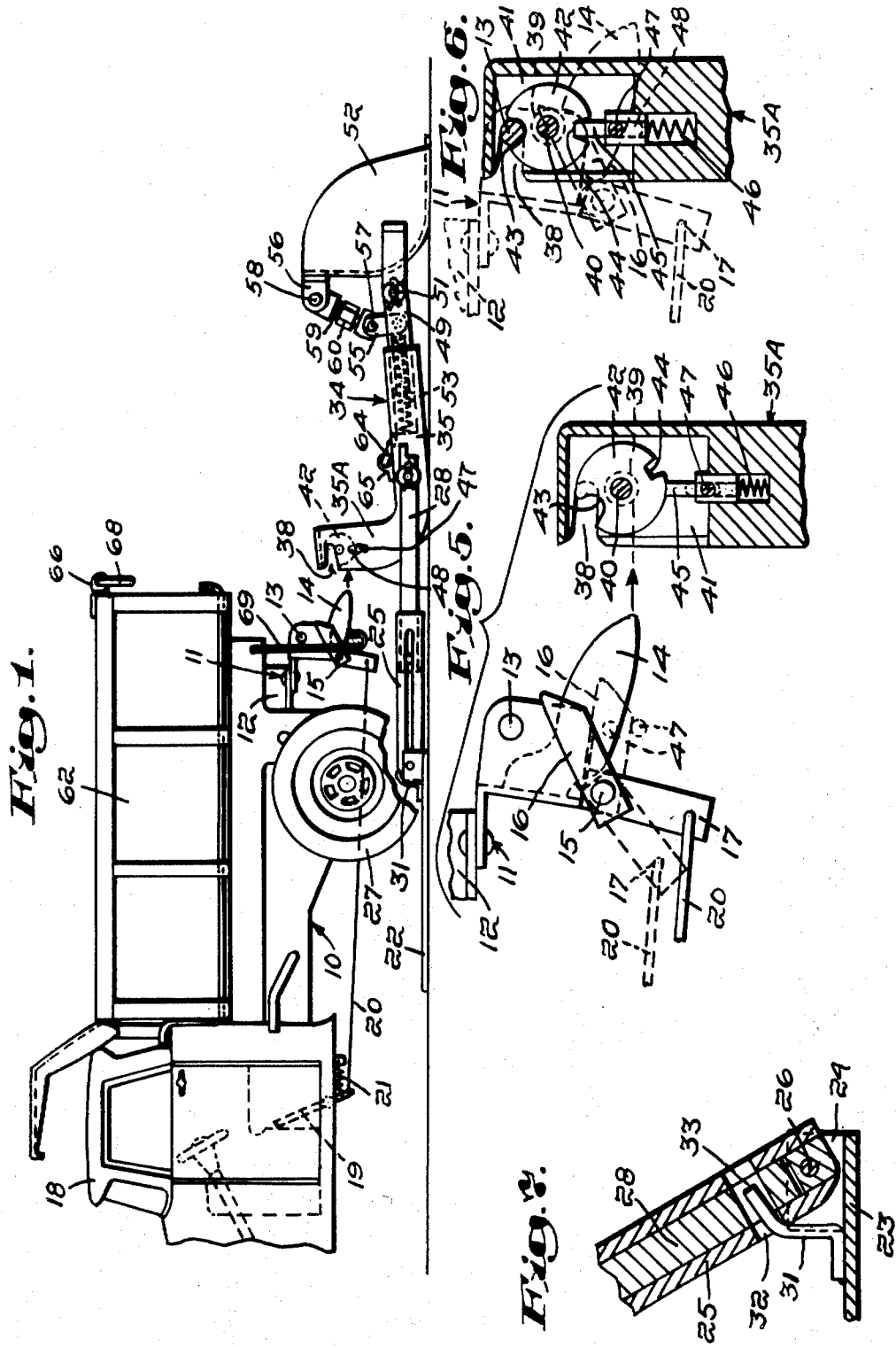

The present invention relates to a loading attachment for trucks, particularly dump trucks, the loading means being buckets.

While the invention is adapted for use with any material that can be handled with a bucket, it is herein discussed with particular reference to the loading of dump trucks with sand from a pile. At the present time, such loading is done with loaders of the type having a conveyor driven by an internal combustion engine. Such loaders are objectionable because of their cost and because their use involves additional manpower.

There is, accordingly, a need for a loader that is easily attached to and removed from a truck by its operator without requiring that he get out of the cab then or during its truck loading operation. In U.S. Letters Patent No. 2,360,341, dated Oct. 17, 1944, there was proposed an attachment for a truck that had a frame with a bucket secured to its rear end. Tread members had bars pivotally connected thereto and to the frame for limited sliding movement. The frame and the truck had coacting coupling means that became operatively engaged when the rear wheels of the truck were backed across the tread members. The truck could then be backed to push the bucket into the sand pile and then driven forwardly across the tread members. While the rear wheels were on the tread members, the tread members were fixed with the result that the frame was swung upwardly and forwardly to bring its bucket into dumping position.

While the general concept was meritorious, the disclosed structure was not adapted to meet actual use requirements and could not be carried over the highways while attached to a truck.

The general objective of the present invention is to provide bucket supporting truck attachments that overcome the shortcomings of the structure disclosed in said patent, an objective attained by providing an attachment having a base including a tread portion for the rear wheels of a truck to which a pair of cylinders are attached to swing forwardly and rearwardly in vertical, parallel planes. Each cylinder has a rod slidably confined therein and a frame is pivotally connected to the free ends of the rods, the frame supporting bucket at its rear end. The front end of the frame extends upwardly, when the attachment is on the ground, and is provided with coupling means on the rear end of a truck as the truck is backed over the tread portion of the base. The truck may then be backed to force the bucket into the material to be loaded and, as the truck is then driven forwardly over the tread portion, the frame is swung upwardly and forwardly into a dumping position over the truck body. The attachment includes means to interlock the frame and the rods to prevent the frame from pivoting rearwardly when the bucket is in a dumping position.

The pivotal connection between the frame and the rods together with the interlocking means enable the bucket to have a dumping position forwardly of the tail gate of the truck body and provides safe loading operations without requiring the driver to be precise in limiting the forward travel of the truck.

Another advantage of the pivotal connection between the frame and the rods is that it enables the objective of portability to be met by providing a dump truck body with means enabling the frame of the attachment to be connected thereto and the truck with means to support the forward ends of the tread portions above the ground. Means are provided to interlock the rods to the cylinders in their retracted position and means are also provided to connect the rods to the frame to prevent the rods from swinging downwardly from a predetermined position. By raising and lowering the truck body in a manner subsequently detailed, the attachment may be readied for travel over the highway by the driver with the only lifting effort being that of lifting the free ends of the tread portions in order to secure them to their supporting means.

Another objective of the invention is to provide a shock absorbing connection between the bucket and the frame, an objective attained by providing the frame with side members that slidably receive side members of a sub-frame with compression springs disposed between the mating ends of the corresponding side members and with an adjustable connection between the frame and sub-frame.

Another objective of the invention is to provide a positive adjustment of the digging angle of the bucket by means of a threaded connection between the upper rear edge of the bucket and the sub-frame.

Yet another objective of the invention is to provide coupling means that ensure safe operation and that is adapted to be released by a control within the cab of the truck. This objective is attained by providing the truck with a draw bar and the upwardly extending frame ends with chambers having transversely aligned slots that forwardly open to receive the draw bar when the attachment is on the ground. The chambers house rotatable locking discs having peripheral pockets to receive the draw bar and to cause the discs to turn as the truck is backed over the base, until engaged by locks. The locks have exposed arms and these are disposed, only when the attachment is resting on the ground, to be engaged and retracted by operator controlled release means. The locks cannot be released when the frame is lifted from the ground ensuring safety and economy results from the fact that the more expensive part of the coupling means is part of the attachment.

In the accompanying drawings, there is shown an embodiment of the invention illustrative of these and other of its objectives, novel features, and advantages.

Figure 2:
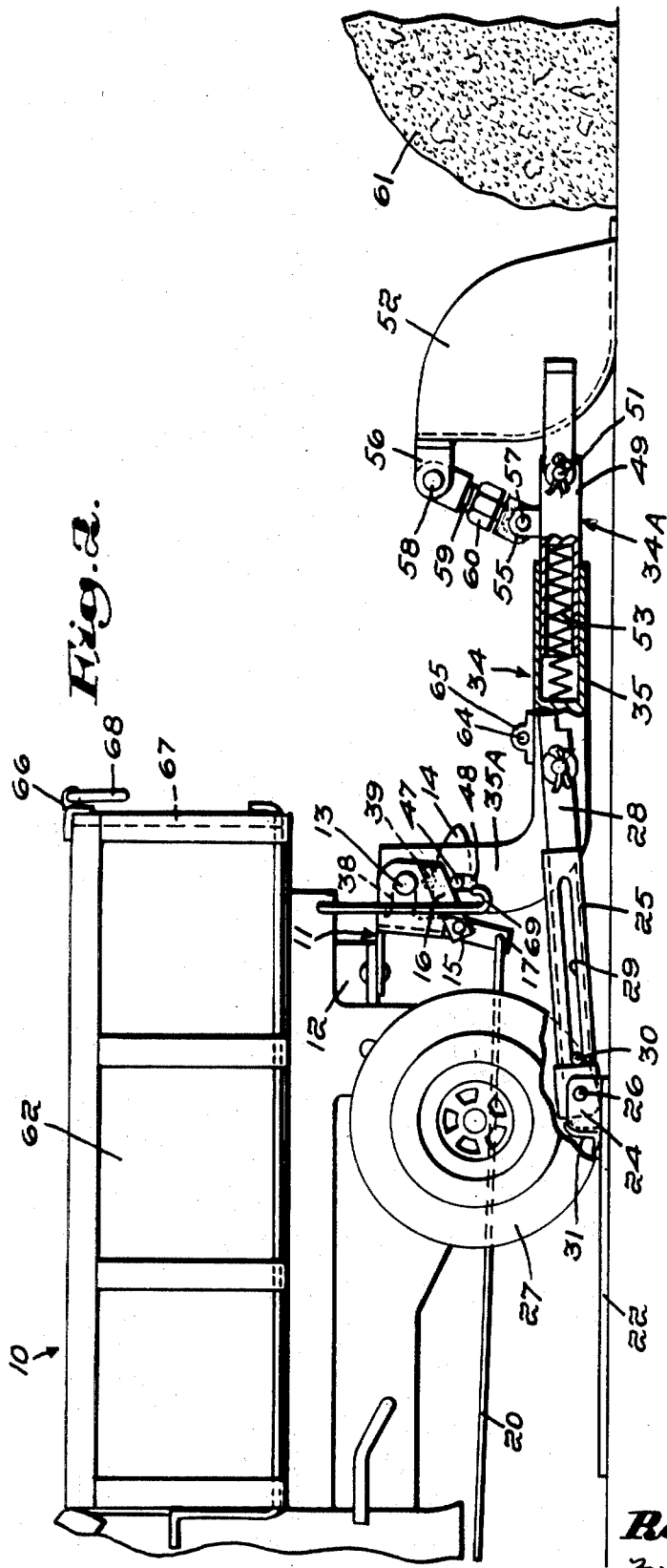
Figure 3:
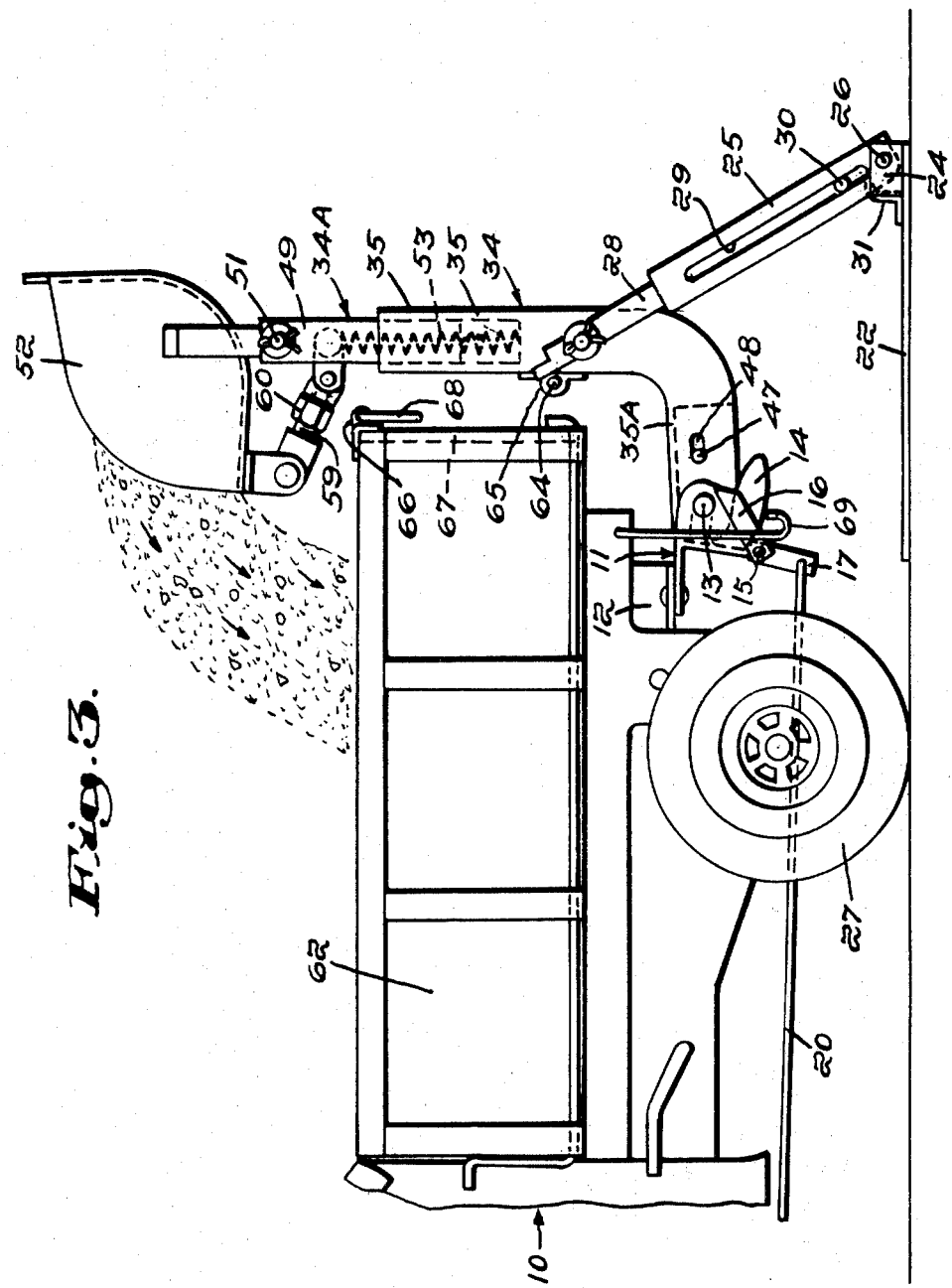

In the drawings:

FIG. 1 is a side view of a truck backing into a coupling position relative to the loading attachment, FIG. 2 is a similar view but with the truck coupled to the attachment, FIG. 3 is a side view showing the attachment in its load-dumping position, FIG. 4 is a plan view of the loading attachment, FIG. 5 is a fragmentary side view, on an increased scale, of the couplers of the truck and the attachment, the attachment coupler being shown in section, FIG. 6 is a similar view but with the coupler engaged, FIG. 7 is a partly sectioned side view, on an increased scale, illustrating the locking of the ends to their cylinders, and FIG. 8 is a side view of the truck with the attachment supported to be carried thereby.

The truck 10 shown in the drawings is illustrative of any dump truck and is not herein detailed except as to parts attached thereto that are required for use with attachments in accordance with the invention.

To that end, a mount 11 is secured to the rear end of the truck frame 12. The mount has a draw bar 13 above a pair of inwardly curved and rearwardly extending ramps 14. Below the draw bar 13, the mount 11 has a shaft 15 having an arm 16 fast on each of its ends and a central arm 17 adapted to be actuted from within the cab 18 as by means of a control lever 19, see FIG. 1, shown as connected to the arm 17 as by a rod 20. The arms 16 are yieldably held in their raised, inoperative position by means of a spring 21 connected to the lever 19.

The attachment consists of a base in the form of a U-shaped plate, see FIG. 4, providing a pair of tread members 22 with a connecting part 23 at their rear ends having two transversely aligned pairs of ears 24 to which cylinders 25 are connected by pivots 26. The tread members are spaced apart and dimensioned so that the rear wheels 27 of the truck 10 may travel lengthwise of them. Each cylinder 25 slidably receives a rod 28 and has transversely aligned, lengthwise slots 29, see FIGS. 3 and 8, slidably receiving pins 30 extending transversely through the rods to limit the sliding movement of the rods 28. The connecting part 23, see FIG. 7, also has a rod-locking hook 31 located forwardly of each pair of ears 24 and disposed to enter a hole 32 in the pivoted end of the cylinders 25 when the cylinders have swung upwardly and forwardly through an arc of slightly more than 90° and then to enter a socket 33 at the bottom end of each rod 28, if that end is then bottomed in its cylinder.

A frame, generally indicated at 34, consists of a pair of tubular side members 35 interconnected by cross members 36 and 37 and having end sections 35A disposed approxiamtely at right angles thus to extend vertically when the attachment is lying on the ground. The ends of the section 35A have transversely aligned, forwardly opening slots 38 to receive the draw bar 13 as the ramps 14 of the truck 10, while being backed, pickup and center the roller 39 supported between the ends of the sections 35A by a rod 40. As it is necessary to lock the sections 35A to the draw bar 13, the end sections 35A establish chambers 41 for locking discs 42 fast on the ends of the rod 40. As may best be seen in FIGS. 5 and 6, the periphery of each disc 42 has a recess 43 dimensioned to receive and accommodate a draw bar end when in registry with the mouth of a slot 38. As the truck is backed, the push of the draw bar 13 causes the discs 42 to turn until the draw bar is bottomed in the slot 38. The discs 42 also have peripheral sockets 44 each dimensioned and disposed then to receive a latch 45 backed by a spring 46 and having a pin 47 extending laterally through a slot 48 which is vertical when the attachment is lying on the ground.

As may best be seen in FIGS. 2 and 6, when the attachment is secured to the draw bar 13 and the attachment is on the ground, the arms 16 are above the pins 47 so that, when the operator pulls the lever 19, the arm 16 forces the latches 45 into their inoperative position thus releasing the discs 42 so that the forward pull of the draw bar 13 will result in their rotation until the draw bar 13 can escape from the slots 38. When, however, the attachment is in a bucket-dumping position, the slots 38 are vertical and the pins 47 are spaced away from the arms 16 so that the attachment cannot be accidentally detached unless it is on the ground.

The free ends of the side members 35 slidably receive rods 49 of a generally indicated sub-frame 34A which are interconnected across member 50 and support, at their free ends, the pivot 51 for the detachable support of the bucket 52. A spring 53 is seated in each side member 35 and backs the rod 49, being held partly compressed by the adjustable threaded connection 54 between the cross members 50 and 36. By this arrangement, a shock absorber connection is established between the bucket 52 and the frame 34.

The cross member 50 and the rear upper edge of the bucket 52 have pairs of ears 55 and 56, respectively, to receive pivots 57 and 58 of the unit by which the digging angle of the bucket 52 may be varied as desired, the unit including a bolt member 59 and a captive nut 60.

With the attachment secured to the truck and lying on the ground, the truck and attachment are driven rearwardly to force the bucket into the material to be loaded, sand from the pile 61, see FIG. 2, for example. The truck is then driven forwardly and then the wheels 27 engage the tread members 22, the position of the base of the attachment becomes fixed so that the pull of the truck swings the frame 34 upwardly and forwardly until the bucket 52 dumps its load into the truck body 62.

It will be noted, see FIG. 4, that the cross member 37 has slots 63 in its rear edge and that stops 64 are slidably mounted for transverse movement in mounts 65 on the forward or upper side of the side member 35 with ends caught in the slots 63. In loading operations, the stops 64 are laterally exposed to be engaged by the ends of the rods 28 when the bucket 52 is in dumping position and prevent the frame 34 from swinging rearwardly and downwardly with the draw bar 13 as its pivot.

It is, of course, necessary to move the attachment from time-to-time from one location to another. To enable such movements to be easily and safely made over highways, the dump body 62 of the truck has a bushing 66 on the upper edge of its tail gate 67. With the attachment in its bucket unloading position and the body 62 raised until the upper edge of the tail gate is in contact with the frame sides 35, see FIG. 8, a shackle 68 is placed around the connection 54 and through the bushing 66. The truck body is then lowered and the stops 64 are retracted. The truck body is again raised until the stops 64 may be operatively positioned at the rear of the frame sides 35 to prevent the rods and cylinders from swinging downwardly to an extent permitting the rear of the base to be too close to the ground. On the lowering of the body 62, the attachment is raised with the exception of the free or forward end of the treads 22. These are manually raised and supported by hooks 69 attached to the undersurface of the body. It will be recalled that when the attachment is in dumping position, the rods 28 are locked against movement outwardly relative to the cylinders 25. By reversing this procedure, the attachment is then lowered and readied for service.

It will be appreciated that the buckets are readily removed and replaced as would be desirable in the use of the attachment as a snow loader.

I claim:

1. A loading attachment for a truck having coupling means at the rear, said attachment comprising a base including a tread portion for the rear wheels of the truck, a pair of cylinders pivotally attached to said base to swing forwardly and rearwardly in parallel, vertical planes, a rod within each cylinder and connected thereto for limited sliding movement, framework pivotally connected to said rods, a bucket, and means connecting said bucket to the rear end of said framework, the forward end of said framework including portions extending upwardly, when the attachment is lying on the ground, said upwardly extending portions including coupling means for coactive engagement with the coupling means of the truck as the truck is backed across the tread portion, said attachment being pulled upwardly into dumping position over the rear end of the truck as the truck is driven forwardly across the tread portion, said rods sliding in and out of the cylinder as the truck travels forwardly and rearwardly relative to the tread portion with the attachment attached, and means to interlock said framework and said rods to prevent said framework from pivoting rearwardly when it is in a dumping position.

2. The loading attachment of claim 1 in which the means connecting the bucket to the rear end of the framework includes a shock absorber.

3. The loading attachment of claim 1 in which the framework includes a main frame and a sub-frame, the main and sub-frame including slidably engaged portions, spring means between said portions yieldably urging them apart, and an adjustable connection between the frame limiting the action of the spring means.

4. The loading attachment of claim 1 in which the means connecting the bucket to the framework includes pivots and an adjustable threaded connection is pivotally connected to the framework and to the bucket adjacent its upper rear edge.

5. The loading attachment of claim 1 in which the means to interlock the framework and the rods is adjustable into a second position in which the rods are prevented from swinging downwardly from a predetermined position when the framework is held vertically.

6. The loading attachment of claim 5 in which the interlocking means are pins attached to the framework adjacent its pivoted connection with the rods also slidable transversely into and out of rod engaging position to enable the pins to limit relative swinging movement between the framework and the rods in either direction.

7. The loading attachment of claim 1 and means to lock each rod in its cylinder when bottomed therein and when the cylinders have swung forwardly to a predetermined extent.

8. The loading attachment of claim 1 in which the base includes a rearwardly extending hook ahead of each cylinder and each cylinder has an opening in which the appropriate one of the hooks enters when that cylinder has swung forwardly to a predetermined extent, and each rod has a pocket in its lower end disposed there to receive a hook if that rod is then bottomed in its cylinder.

9. The loading attachment of claim 1 in which the coupling means includes portions disengageable from the coupling means of the truck unless the attachment is resting on the ground.

10. The loading attachment of claim 1 in which the free ends of the framework portions have chambers and transversely aligned slots open into the chambers and are disposed to receive the coupling means at the rear of the truck when the attachment is resting on the ground, a locking disc transversely pivoted in each chamber and having a pocket normally disposed in alignment with the slot of that chamber to receive the attaching means of the truck and to be turned thereby as the truck is backed until the coupling means of the truck are seated in said slots, said disc also having a notch, and a spring pressed lock in each chamber for entry into the notch of the discs, said notches being located to receive the locks when the coupling means of the truck are seated in the slots, each chamber having vertical slots in its side and each lock includes a release pin slidably exposed through that slot to enable the locks to be retracted from the notches.

11. In combination a dump truck having a draw bar at the rear, and a loading attachment, said attachment comprising a base including a tread portion for the rear wheels of the truck, a pair of cylinders pivotally attached to said base to swing forwardly and rearwardly in parallel, vertical planes, a rod within each cylinder and connected thereto for limited sliding movement, framework pivotally connected to said rods, a bucket and means connecting said bucket to the rear end of said framework, the forward end of said framework including portions extending upwardly, when the attachment is lying on the ground, said upwardly extending portions including coupling means for coactive egagement with the coupling means of the truck as the truck is backed across the tread portion, said attachment being pulled upwardly into dumping position over the rear end of the truck as the truck is driven forwardly across the tread portion, said rods sliding in and out of the cylinder as the truck travels forwardly and rearwardly relative to the tread portion with the attachment attached, and means to interlock said framework and said rods to prevent said framework from pivoting rearwardly when it is in a dumping position.

12. The combination of claim 11 in which the truck has adjacent the upper edge of its tailgate means to connect the framework thereto in a substantially vertical position and the truck also includes means to detachably support the forward ends of the tread portion, and the means to interlock the framework and the rods has a second position in which the rods are prevented from swinging downwardly when the framework is held vertically.

13. The combination of claim 11 in which the truck includes ramps that curve both downwardly and inwardly and are dimensioned for entry between the framework portion, and the framework portion includes a roller adjacent their free ends for engagement with said ramps.

14. The combination of claim 12 in which the coupling means of the attachment includes transversely aligned slots to receive the draw bar when the attachment is resting on the ground and to block the release of the draw bar when the framework is elevated.

15. The combination of claim 14 in which the coupling means of the attachment includes a release and the truck includes means operable to actuate the release and in operative engagement therewith only when the attachment is on the ground.

16. The loading attachment of claim 1 in which the free ends of the framework portions have chambers and transversely aligned slots open into the chambers and are disposed to receive the draw bar when the attachment is resting on the ground, a locking disc transversely pivoted in each chamber and having a pocket normally disposed in alignment with the slot of that chamber to receive the draw bar and to be turned thereby as the truck is backed until the draw bar is seated in said slots, said disc also having a notch, and a spring pressed lock in each chamber for entry into the notch of the disc, said notches being located to receive the lock when the coupling means of the truck are seated in the slots, each chamber having vertical slots in its side and each lock includes a release pin slidably exposed through that slot for engagement by the release operating means of the truck.

References Cited

UNITED STATES PATENTS 2,360,341  10/1944  Herrick _____ 214—354

FOREIGN PATENTS 273,838  6/1951  Switzerland.

ALBERT J. MAKAY, Primary Examiner

U.S. Cl. X.R.

214—78